United States Patent [19]

Yamamura

[11] Patent Number: 5,134,520
[45] Date of Patent: Jul. 28, 1992

[54] DOUBLE DIRECTIONAL IMAGE DEVELOPMENT HEAD-UP DISPLAY OPTICAL SYSTEM

[75] Inventor: Souhei Yamamura, Takarazuka, Japan

[73] Assignee: Matsushita Electric Industrial Co., Ltd., Osaka, Japan

[21] Appl. No.: 691,333

[22] Filed: Apr. 25, 1991

[30] Foreign Application Priority Data

Apr. 25, 1990 [JP] Japan ................................. 2-109044
Aug. 9, 1990 [JP] Japan ................................. 2-212572

[51] Int. Cl.⁵ .............................................. G02B 27/14
[52] U.S. Cl. .................................. 359/630; 359/634; 359/742
[58] Field of Search ............... 350/171, 174, 169, 173, 350/452; 340/705

[56] References Cited

U.S. PATENT DOCUMENTS

| | | |
|---|---|---|
| 3,840,289 | 10/1974 | Day . |
| 4,266,854 | 5/1981 | Avicola ................. 350/171 |
| 4,269,475 | 5/1981 | Ellis . |
| 4,368,950 | 1/1983 | Sakamoto ............... 350/171 |
| 4,616,217 | 10/1986 | Nesbitt et al. ........... 340/705 |
| 4,714,320 | 12/1987 | Ellis . |
| 4,714,320 | 12/1987 | Banbury . |
| 4,930,865 | 6/1990 | Dosmann . |

FOREIGN PATENT DOCUMENTS 61-238014 10/1986 Japan .
64-35478 2/1989 Japan .
2-241843 9/1990 Japan .

OTHER PUBLICATIONS

1980 SID International Symposium Digest of Technical Papers; Apr., 1980; Lewis Winner, Coral Gables, Fla. 33134; 6.3/3:00 P.M.: Diffraction Optics Heads-Up Display Technology; Martin Weihrauch et al.; Hughes Aircraft Company; El Segundo, Calif.

Primary Examiner—Jon W. Henry
Attorney, Agent, or Firm—Wenderoth, Lind & Ponack

[57] ABSTRACT

A double directional image development HUD includes a combiner having individual spectral distributions perfectly separated from each other, wherein the image displayed on an LCDU is formed using green light with a sharp spectral distribution and using another color light with a different wavelength, and wherein light beams projected from the LCDU onto a combiner are perfectly divided into two beams, i.e., a reflection light beam and a transmission light beam both of which are perfectly separated from each other, thereby obtaining a clear projected image to be observed by the observers inside and outside the combiner without any contamination.

8 Claims, 8 Drawing Sheets

DOUBLE DIRECTIONAL IMAGE DEVELOPMENT HEAD-UP DISPLAY OPTICAL SYSTEM

BACKGROUND OF THE INVENTION

1. Field of the Invention

The present invention relates to a head-up display system, and in particular to a head-up display system in which there are displayed image data individually, which are the same or different, on both sides of a combiner provided in a part of an upper portion of a glass window or door of a bus, train or shop, thereby providing information to customers or passengers both inside and outside the shop, train or the like.

2. Description of the Prior Art

A head-up display system (referred to a HUD hereinafter) is an apparatus for use in a cockpit of an aircraft or in other various field. By providing such a HUD for example in a cockpit in an aircraft, it becomes possible for a pilot to confirm necessary information without turning his eyes from his operating direction to a dashboard direction. Such a HUD has been proposed in the prior art and reference may be made to U.S. Pat. No. 3,737,212 in 1973 and U.S. Pat. No. 4,218,111 in 1980 for a better understanding of such proposals. On the other hand, for increment of optical efficiency of a light source and combiner in a HUD, as is described in the "DIFRACTION OPTICS HEAD-UP DISPLAY TECHNOLOGY," reported by MARTIN WEIHRAUCH and ROBERT A. L OHMANN, SID 80 DIGEST, there is utilized a light source emitting green light with a sharp spectral distribution together with a combiner which has a high reflectivity with respect to this green light and which attenuates green light from the external view, thereby improving the brilliancy or definition of a picture of image data developed on the combiner in a HUD with enhancement of efficiency in association with the quantity of light.

However, in such a conventional HUD, there is provided a display of image data necessary for the operator superimposed on the real world scene in the pilot's forward visual field. That is to say, the image data is combined with the data of the external view in the forward direction of the pilot, and the combined image data can be seen using the two eyes of the observer alone. There is no idea, in the conventional HUD, that a plurality of image data are divided into two directions through a combiner so as to be individually displayed on the dual sides of the combiner in such a manner that the customers or passengers in the dual sides thereof can confirm the displayed picture of the image data.

Moreover, when a picture of projected image data is developed on one side of the combiner based on the reflection light beam reflected by the combiner and another picture of the same or different image data is developed on the other side of the combiner based on the transmission. light beam transmitted through the combiner, both of the two pictures are respectively displayed on the dual sides of the combiner so as to be viewed by customers or passengers present in the dual directions with respect to the combiner, and in this case, the original image data of the projected image in the direction of the reflection light with respect to the combiner must be laterally reversed for the customers to read the picture of the projected image correctly because the picture of the virtual image formed by the reflection light with respect to the combiner is laterally reversed. Also, it is required to provide a total reflection mirror for totally reflecting the laterally reversed image, in other words, the system must be provided with two series of units independent of each other for preventing occurrence of a crosstalk or superimposition between the projected image in the direction of the transmission light and that of the reflection light, resulting in a large scale of the system and deteriorating or contaminating the quality of the projected image.

Moreover, there is another problem that, when the positions of the eyes of the observes in the respective sides of the combiner are apart from the position of the optical lens system of the HUD, the range of the projected image to be seen becomes narrow. Therefore, it is required to provide an optical lens system with a large aperture, resulting in increasing the cost thereof and being large in size thereof.

SUMMARY OF THE INVENTION

In order to overcome the problem mentioned above, the present invention has been devised, and an essential of the present invention is to provide a double directional image development HUD with a large angle of visual field having characteristics of a combiner improved, wherein the reflection light beam and transmission light beam have individual spectral distributions separated from each other, and the same or different image data are displayed on the dual sides of the combiner at the same time so as to be correctly observed by the observers in the both sides of the combiner without any contamination due to occurrence of crosstalk between the projected image of the reflection light beam and that of the transmission light beam.

In order to attain the object mentioned above, the double directional image development HUD of the present invention includes:

a combiner having individual spectral distributions perfectly separated from each other with respect to the reflection light and transmission light;

an optical projector projecting light representing a display of image data onto the combiner for reflection thereby and for transmission therethrough to provide an observer with an image of the display; and an image reversing device for reversing at least a part of the image to be displayed.

In addition, when a magnified virtual image is formed using the optical lens system which is partially composed of a flexible Fresnel lens, the peripheral portion of the Fresnel lens is appropriately curved or bent and is fixed to a rectangular frame body for holding the lens system, thereby compensating for the distortion of the image when formed with a large angle of field.

According to a feature of the present invention, the spectral distribution characteristic of the reflection and transmission light beams of the combiner is made identical with the spectral distribution characteristic of the light beams projected by the optical projector, maintaining the best effect of separating the spectral distributions of the combiner with respect to the reflection light and the transmission light, so that the individual image data displayed on the dual sides of the combiner can be respectively observed by the observers in the dual sides of the combiner without any contamination due to occurrence of crosstalk between the reflection light and the transmission light.

Moreover, on the darker side of the two sides of the combiner the display of the image is performed using green light, so that the contrast between the displayed picture of the image data and the background view can be enhanced so as to improve the resolution or visibility of the image data.

The features of the present invention which are believed to be novel are set forth with particularity in the appended claims. The present invention together with further objects and advantages thereof may best be understood with reference to the following detailed description, taken in conjunction with the accompanying drawings.

DETAILED DESCRIPTION OF THE PREFERRED EMBODIMENT

A preferred embodiment of a HUD according to the present invention will be described with reference to FIGS. 1 to 9.

Figure 1A:
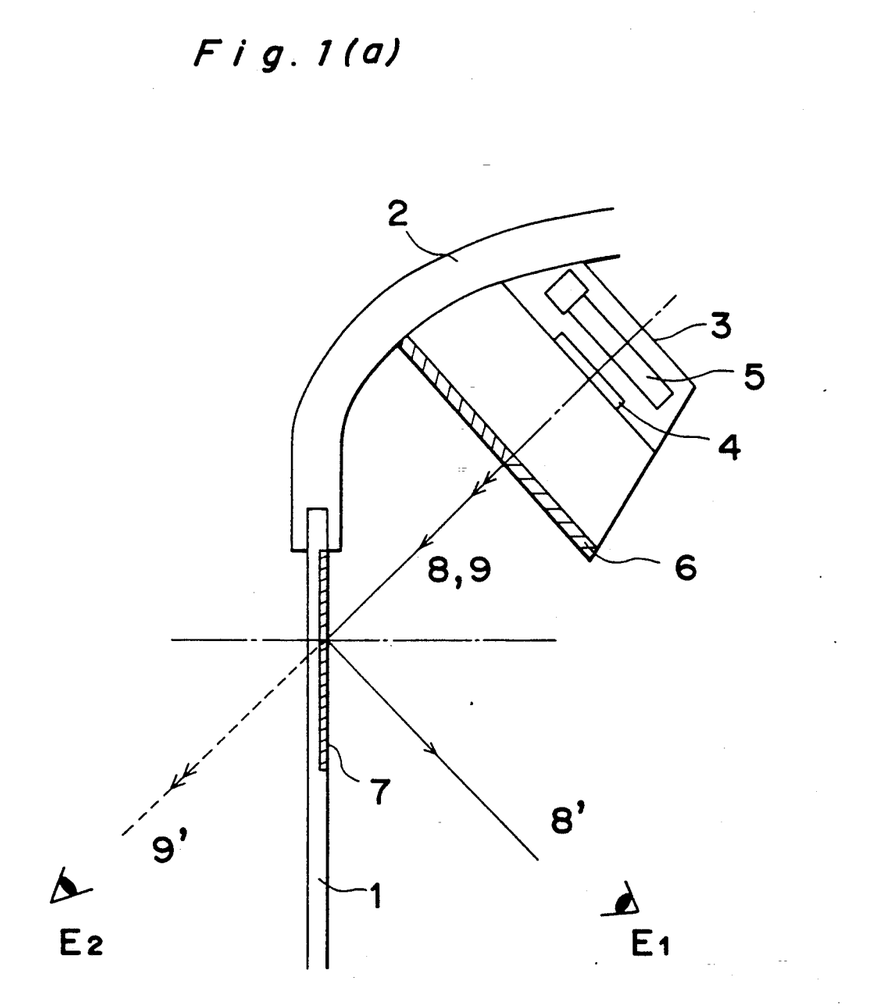
FIG. 1(a) is a schematic diagram showing an embodiment of a HUD according to the present invention.

As shown in FIG. 1(a), reference numeral 1 denotes a glass door or window of such as a bus, train or shop, and the upper portion of the glass door or window is rigidly attached to a lower edge of a roof member 2. A generally rectangular housing 3 containing optical means such as a light source and a display unit is fixed to the lower side of the roof member 2 inside the shop, train or the like with its optical axis coaxially set. The housing 3 includes, a liquid crystal display unit (referred to as LCDU hereinafter) 4 of a TFT transmission type, a light source 5 such as a fluorescent lamp disposed rearward of the LCDU 4 and further includes an optical unit 6 composed of a Fresnel lens and the like for magnifying an image displayed on the LCDU 4 to form a virtual image thereof. On the other hand, light beams 8 and 9 representing the image displayed on the LCDU 4 are transmitted through the optical unit 6 and projected to a combiner 7 of a perfect separation type with its spectral distributions perfectly separated. The combiner 7 is bonded to an inner surface of an upper portion of the glass window 1, so that the light beams 8 and 9 projected to the combiner 7 are divided into two beams, i.e. reflection light beam 8' and transmission light beam 9' in accordance with the characteristic of the spectral distribution of the combiner 7. That is to say, the projected image developed with green light is reflected by the combiner 7 and is received by eyes E1 in the direction shown by the light beam 8', and the projected image developed with red and blue light other than the green light is transmitted through the combiner 7 so as to be received by eyes E2 in the direction shown by the light beam 9'.

Figure 2:
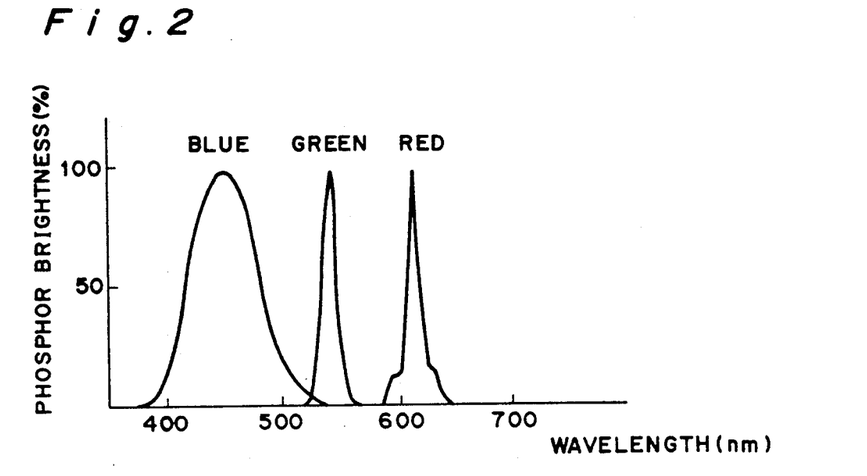
FIG. 2 is a graph view showing a spectral power distribution of a color filter including a light source and display unit in the HUD shown in FIG. 1(a)

FIG. 2 shows a total spectral power distribution of a color filter of the light source 5 and TFT transmission type LCDU 4, wherein the spectral power consists of the blue, green and red light.

Figure 3:
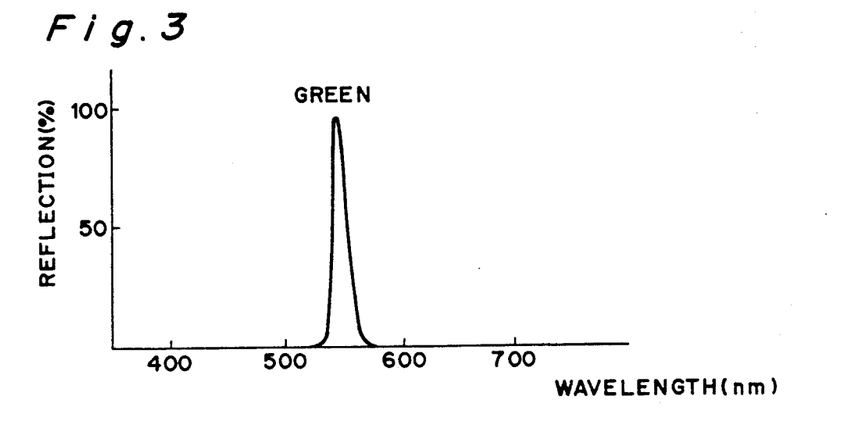
FIG. 3 is a graph view showing a spectral distribution of reflection light reflected by a combiner for use in the HUD shown in FIG. 1(a)

Referring to FIG. 3 showing a spectral distribution with respect to the reflection light reflected by the combiner 7, only a sharp range of green light of a wavelength of e.g. 543 nano meters is reflected by the combiner 7, while the light of the other ranges of the wavelength than that of the green light is not reflected by the combiner 7.

Figure 4:
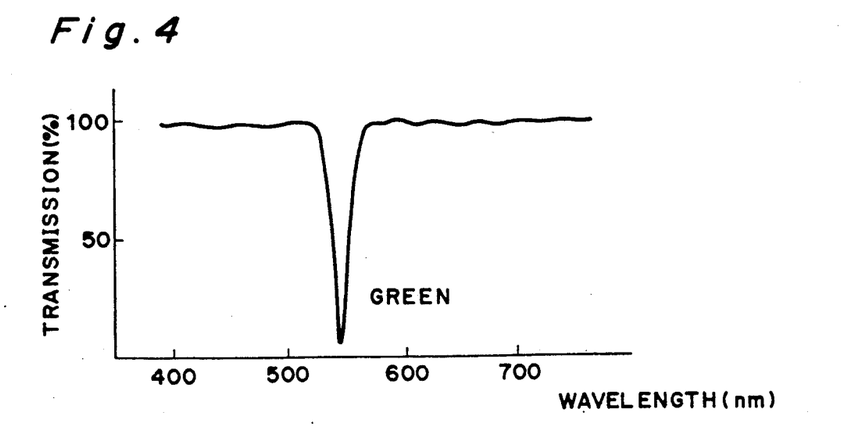
FIG. 4 is a graph view showing a spectral distribution of transmission light transmitted through the combiner of FIG. 3.
Figure 5:
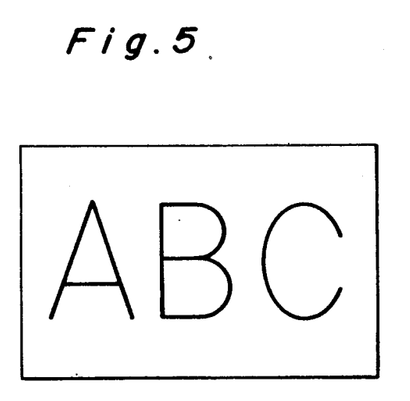
FIG. 5 is a schematic diagram showing an example of a projected image in the direction of the transmission light in the HUD shown in FIG. 1(a)

On the contrary, referring to FIG. 4 showing a spectral distribution with respect to the transmission light transmitted through the combiner 7, only the very sharp range of the green light of a wavelength of e.g. 543 nano meters is greatly attenuated, and the other light beams of the wavelength ranges other than that of the green light are all transmitted through the combiner 7. According to the spectral distribution characteristics of the combiner 7, the green light with a sharp range of wavelength is reflected by the combiner 7 as the reflection light thereof, and the other light such as blue and red light with the ranges of wavelength other than that of the green light is transmitted through the combiner 7 as the transmission light thereof, thereby perfectly separating the green light beam from the the other light beams. Herein, the wavelength of e.g. 543 nano meters with respect to the green light shown in FIG. 3 is made coincident with that of the green light shown in FIG. 4, thereby improving the effect of the spectral separation of the combiner 7.

Figure 6:
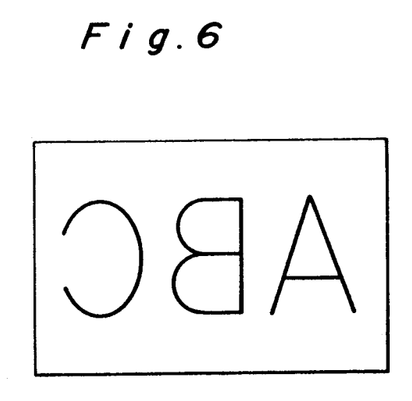
FIG. 6 is a schematic diagram showing an example of a projected image in the direction of the reflection light in the above HUD.

Referring to FIG. 1(a) again, it is required that the original image data to be displayed on the TFT transmission LCDU 4 should be arranged in such a manner that the displayed picture of the image data can be read correctly when they are observed with the eyes E1 and E2 in the reflection and transmission directions respectively. Therefore, only the original image data observed by the eyes E1 in the direction of the reflection light beam 8' must be laterally reversed as shown in FIG. 6. The laterally reversed image is formed by means of an image reversing device and is combined with the erect (or unreversed) image so that the combined images are displayed on the TFT transmission LCDU 4.

Figure 1B:
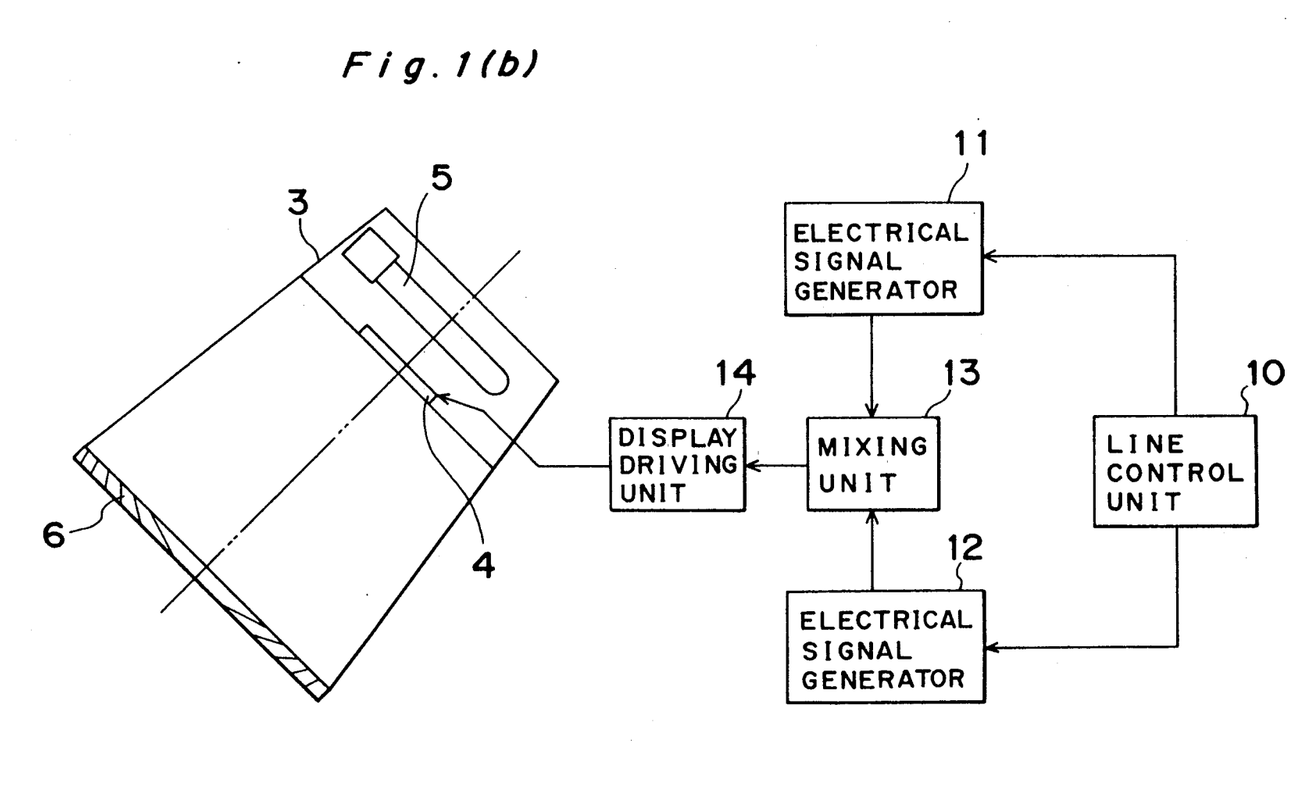
FIGS. 1(b) and 1(c) are block diagrams each showing an image reversing device.

FIG. 1(b) shows an image reversing device, wherein there is provided a line control unit 10 for controlling electrical signal generators 11 and 12 for generating erect image data and reversed image data respectively. The electrical erect image signal and the electrical reversed image signal are respectively generated by the electrical signal generators 11 and 12 and both of the image data signals are transmitted to a mixing unit 13 for mixing the electrical erect and reversed image signals. The output signals of the mixing unit 13 are transmitted to the LCDU 4 through a display driving unit 14. By this arrangement, the image data of characters or figures are processed every one line, and each line of erect image of characters and each line of reversed image of characters are independently displayed on the LCDU 4 separatedly from each other. In this example, the reversed image is formed by processing the signals of the original image data when they are transmitted to the LCDU 4 and the reversed image is displayed with the green light.

Figure 1C:
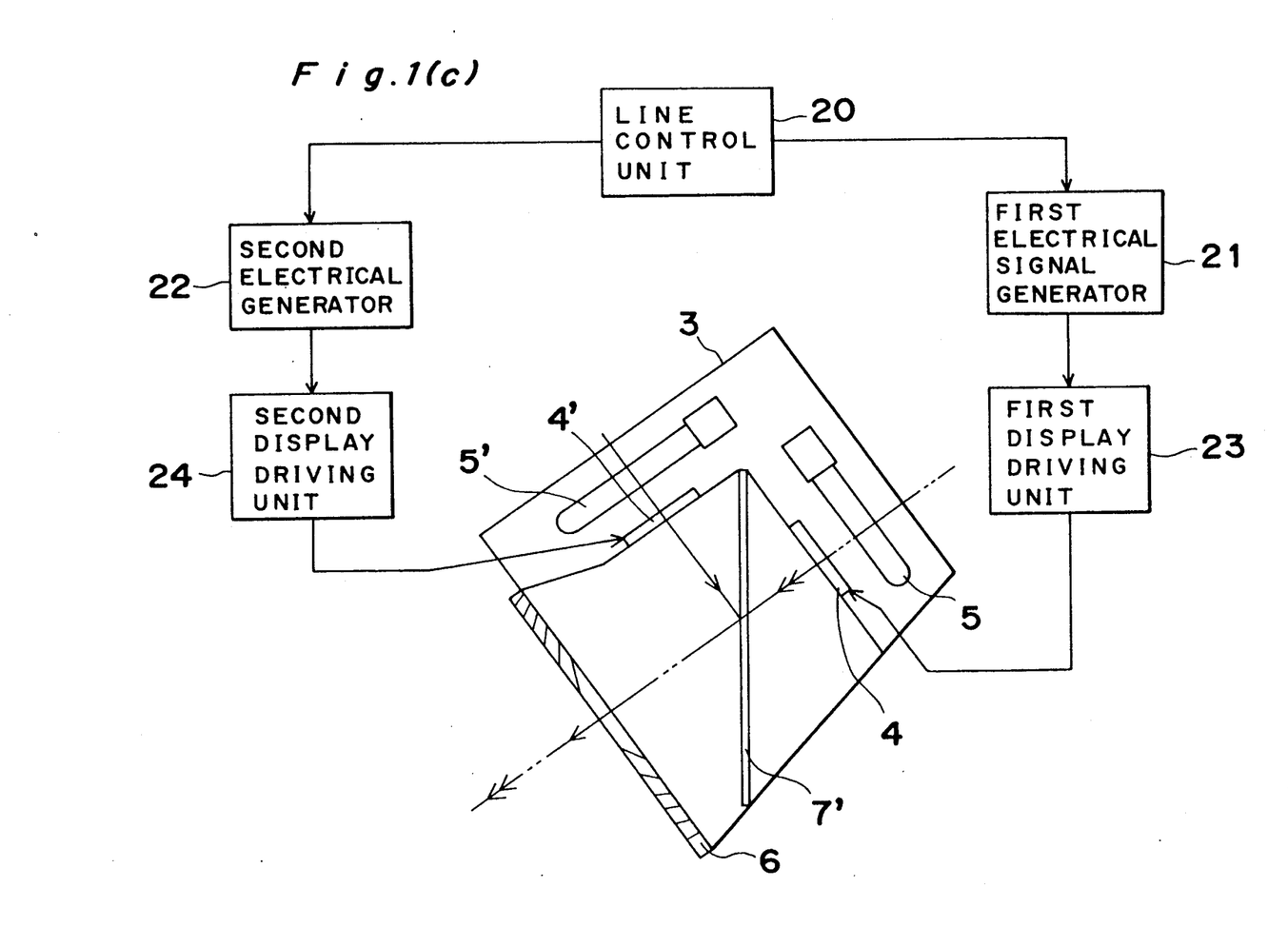

FIG. 1(c) shows another example of an image reversing device, wherein there is provided a line control unit 20 for controlling first and second electrical signal generators 21 and 22 of which the output signals are respectively transmitted to first and second TFT transmission LCDUs 4 and 4' through first and second display driving units 23 and 24. In this example, the image displayed on the second LCDU 4' having a structure similar to that of the TFT transmission LCDU 4 is then projected to a semitransparent mirror 7' using light beams produced by a light source 5' and the projected image is reflected by the semitransparent mirror 7' at generally right angles, thereby forming an optically reversed image. The semitransparent mirror 7' has characteristics of enhancing the optical effect of the HUD similarly to those of the perfect separation combiner 7 shown in FIG. 1(a).

Moreover, such a reversing device for forming a reversed image of characters may be constructed by providing another sheet of TFT transmission LCDU turned out.

On the other hand, in any case, there is no need to laterally reverse the picture of the original image to be received by the eyes E2 in the direction of the transmission light beam 9' shown in FIG. 1(a).

Next, another example of display means of the same type as that of the TFT transmission LCDU 4 is described.

Figure 7:
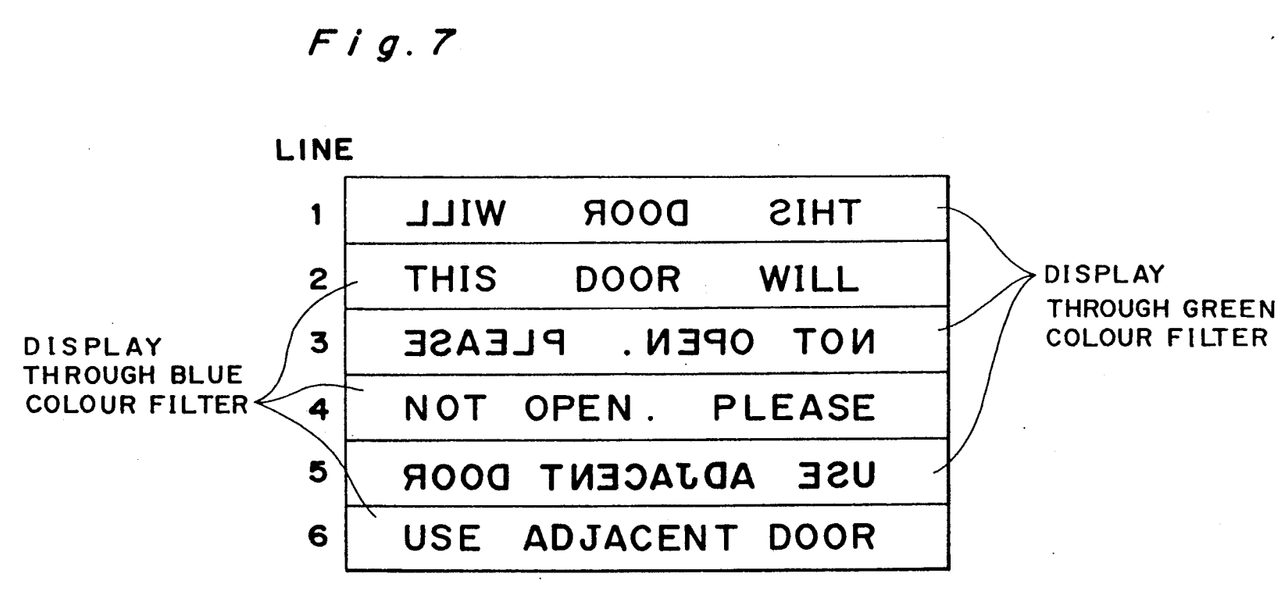
FIG. 7 is a schematic diagram showing an example of a projected image when adding a color filter in each of the lines.

FIG. 7 shows an example of display contents of an image displayed on the TFT transmission LCDU 4 shown in FIG. 1(a), wherein the image data of characters and figures to be observed by the observers in the side of the reflection light beam 8' are displayed on the odd lines 1, 3 and 5 in the panel of the LCDU 4 with green light and the image data to be observed by the observers in the side of the transmission light beam 9' are displayed on the even lines 2, 4 and 6 in the panel of the LCDU 4 with blue light. This display means shows a line-division color specification panel which is constructed in such a manner that the green light and blue light as shown in FIG. 2 are obtained as the total spectral power distribution characteristics of the optical system including the light source 5 and that the green and blue light beams are effectively separated from each other by the combiner 7. In other words, the green light beam from the light source 5 is reflected by the combiner 7 so as to be received by the eyes E1 as the reflection light 8', and the blue light beam from the light source 5 is transmitted through the combiner 7 so as to be received by the eyes E2 as the transmission light 9'.

The resolution of a picture of image data such as characters or figures displayed on one line in the panel of the LCDU 4 is determined depending on the total number of the basic monochromatic picture elements. Therefore, the resolving power of the HUD using a monochromatic light beam can be made higher than that of a color television panel using basic three picture elements as the three primaries trio consisting of R (red), G (green) and B (blue) in which the resolving power is lowered to ⅓ compared to that of the HUD. Moreover, since the green pass filter and blue pass filter are respectively added for the individual odd and even lines of the panel of the LCDU 4, there is no need for each color filter mosaic to be positioned precisely on each picture element with its own, thereby improving the yield with the cost thereof lowered.

As described above, since the image displayed on the panel of the TFT transmission LCDU 4 is formed using a green light beam with a sharp spectral distribution of a wavelength of e.g. 543 nano meters and using another light beam with a wavelength other than that of the green light, therefore the light beams 8 and 9 projected from the LCDU 4 onto the combiner 7 are perfectly divided into two beams, i.e., the reflection light beam 8' and the transmission light beam 9' both of which are perfectly separated from each other, thereby obtaining a clear projected image to be observed by the observers in each of the directions inside and outside the combiner 7 without any contamination due to the occurrence of crosstalk.

Next, an optical mechanism for projecting an image displayed on the TFT transmission LCDU 4 in a wide range of the combiner 7 through a Fresnel lens 6 will be described with reference to FIGS. 8 and 9.

Figure 8:
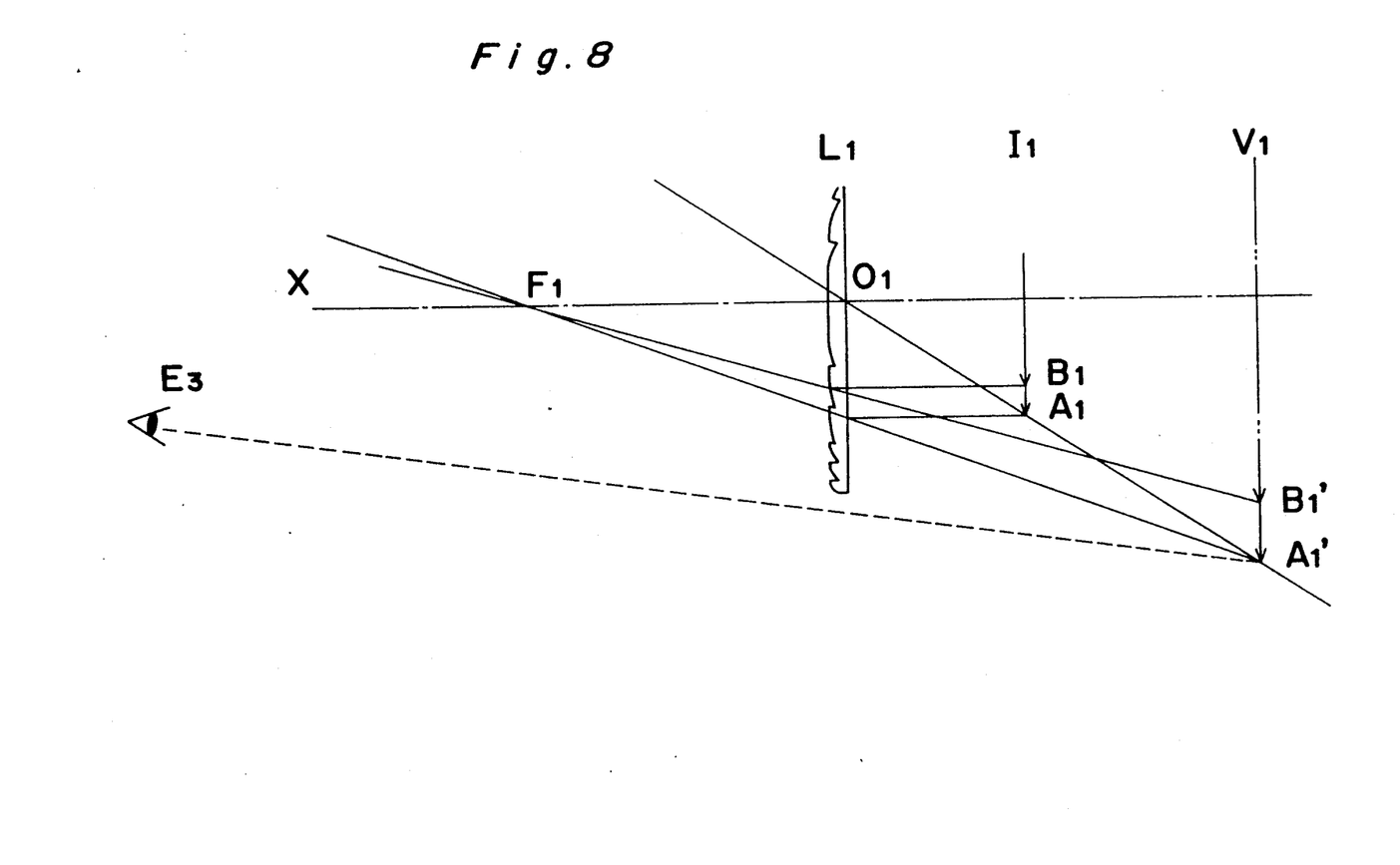
FIG. 8 is a schematic view showing an optical lens system composed of a Fresnel lens in a flat condition.

FIG. 8 shows an optical magnifying mechanism using a Fresnel lens L1 as the optical unit 6. In FIG. 8, an image I1 with its tip portions A1 and B1 displayed on the TFT transmission LCDU 4 shown in FIG. 1(a) is magnified through the Fresnel lens L1 so as to obtain a magnified virtual image V1 with its tip portions A1' and B1', so that the magnified virtual image V1 can be seen by eyes E3 of an observer present in an off-center position from the optical axis X of the Fresnel lens L1. FIG. 8 shows that, since the position of the eyes E3 is far from the Fresnel lens L1, the aperture of the Fresnel L1 is seen to be relatively so small that the tip A1' of the virtual image V1 is out of the visual field from the position of the eyes E3.

Figure 9:
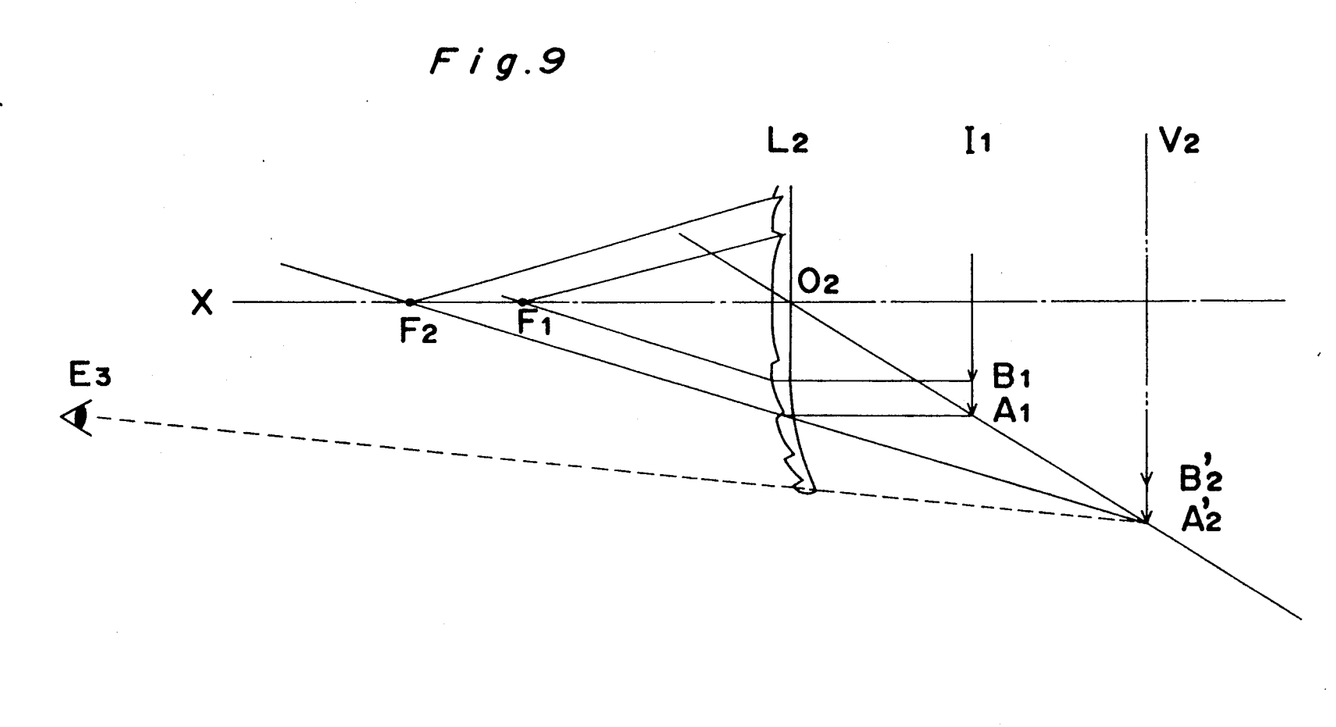
FIG. 9 is a schematic view showing an optical lens system composed of a Fresnel lens in a curved condition.

FIG. 9 shows a preferred example of an optical mechanism using a modified Fresnel lens L2 of which the peripheral portion is appropriately bent. As shown in FIG. 9, the peripheral portion of the Fresnel L2 is appropriately bent, wherein the bending amount thereof is adjusted by a cut-and-try method so as to decrease the refractive power of lens, thereby refracting the optical path in such a manner that the focal length of the Fresnel lens L2 is made longer than that of the Fresnel lens L1 of a flat type. By modifying the peripheral portin of the Fresnel lens L2 as described above, even in the case where the magnified virtual image V2 with its tip portions A2' and B2' of the image I1 with its tip portions A1 and B1 is seen from a position of E3 in a wide angle of field, the tip portion A2' of the virtual image V2 can be prevented from being out of the visual field.

As described above, according to the preferred embodiment of the present invention, by constructing a perfect separation type combiner 7 with its reflection and transmission spectral distribution as shown in FIGS. 3 and 4, it is possible to develop individual projected images independently on both sides of the combiner 7 without any contamination due to occurrence of crosstalk. Moreover, by developing a projected image using a green light beam on one side of the combiner 7 having the lower illuminance among the two sides of the combiner 7, it becomes possible to develop a clear image with high visibility. In addition, by using a monochromatic TFT transmission LCDU 4 and by coloring the light beams through a color filter, it becomes possible to display an image with higher definition or quality.

Furthermore, by using a Fresnel lens L2 as the optical unit 6 and by bending the peripheral portion of the Fresnel lens L2, it becomes possible to develop a projected image in a wide angle of field.

In addition, in the preferred embodiment of the present invention, although the separation between the erect image and the laterally reversed image is performed by utilizing the spectral distribution characteristics of the combiner, the separation can be performed by utilizing a polarization characteristics or holography.

As described above, according to the present invention, by utilizing the perfect separation characteristic of a combiner used in a HUD, a plurality of image data displayed on the LCDU are separated into two directions, i.e. inside and outside of the combiner, so that a display of clear projected image can be provided to the customers both inside and outside a shop or the like without any contamination due to occurrence of crosstalk between the reflection light and the transmission light.

What is claimed is:

1. A double directional image development head-up display system comprising:
    a combiner having its individual spectral distributions of reflection light and transmission light perfectly separated from each other;
    an optical projector including a light source and display unit; for projecting light beams representing a display of image data onto said combiner for reflection thereby and for transmission therethrough to provide observers with a developed image of the display; and
    an image reversing means for reversing at least a part of the image to be displayed on the display unit with the reflection light, whereby the same or different image data are developed on the dual sides of the combiner at the same time so as to be correctly observed by the observers present on both sides across the combiner.

2. The head-up display system according to claim 1, wherein the development of an image projected from said optical projector onto one side of said combiner having the lower illuminance among the two sides thereof is performed using green light.

3. The head-up display system according to claims 1 or 2, wherein the contents of the image displayed on said display unit in the optical projector are developed in blocks of each line on said combiner, the display contents displayed on the front side of the combiner and those displayed on the rear side of the combiner being developed on the odd lines and even lines alternately with the reflection light and the transmission light respectively.

4. The head-up display system according to claim 3, wherein said optical projector is provided with two kinds of color filters for respectively coloring light passing therethrough with two different colors, the lines of the image to be developed on the front side of the combiner and the lines of the image to be developed on the rear side of the combiner being respectively colored with said two different colors of light through said two kinds of color filters.

5. The head-up display system according to claim 1, wherein the image displayed on the display unit in said optical projector is a monochrome image, wherein the image to be developed on the front side of the combiner and the image to be developed on the rear side of the combiner are respectively colored with different colors of light through one or more color filters provided in said optical projector.

6. The head-up display system according to claims 1 or 2, wherein said optical projector includes a 7. The head-up display system according to claim 3, wherein said optical projector includes a Fresnel lens with its peripheral portion bent to develop a projected image in a wide angle of field on the combiner.

8. The head-up display system according to claim 4, wherein said optical projector includes a Fresnel lens with its peripheral portion bent to develop a projected image in a wide angle of field on the combiner.

* * * * *